(12) United States Patent
Torres

(10) Patent No.: US 9,939,656 B1
(45) Date of Patent: Apr. 10, 2018

(54) NOSE PAD

(71) Applicant: Felix Torres, Miami, FL (US)

(72) Inventor: Felix Torres, Miami, FL (US)

(*) Notice: Subject to any disclaimer, the term of this patent is extended or adjusted under 35 U.S.C. 154(b) by 313 days.

(21) Appl. No.: 14/542,573

(22) Filed: Nov. 15, 2014

Related U.S. Application Data

(60) Provisional application No. 61/963,323, filed on Dec. 2, 2013.

(51) Int. Cl.
*G02C 5/12* (2006.01)

(52) U.S. Cl.
CPC .................... *G02C 5/122* (2013.01)

(58) Field of Classification Search
CPC .......... G02C 5/12; G02C 5/122; G02C 5/124; G02C 5/126; G02C 5/128
See application file for complete search history.

(56) References Cited

U.S. PATENT DOCUMENTS

| | | | |
|---|---|---|---|
| 4,070,104 A | | 1/1978 | Rice |
| 4,470,674 A | * | 9/1984 | Piampiano ............. G02C 5/124 351/128 |
| 5,369,451 A | | 11/1994 | Tamagawa |
| 5,790,230 A | * | 8/1998 | Sved ....................... A61F 9/025 351/110 |
| 5,909,267 A | * | 6/1999 | Hall ........................ A61F 9/028 2/453 |
| 7,111,936 B1 | | 9/2006 | Chuang |
| 7,380,934 B1 | * | 6/2008 | Wang Lee ............. G02C 5/122 351/136 |
| 7,513,618 B2 | | 4/2009 | Mikame |
| 7,543,933 B2 | * | 6/2009 | Lee ........................ G02C 5/126 351/136 |
| 9,128,303 B1 | * | 9/2015 | Lier ....................... G02C 5/126 |
| 2008/0259271 A1 | * | 10/2008 | De La Renaudiere ............ G02C 5/126 351/139 |

FOREIGN PATENT DOCUMENTS

JP          2014098881 A   *   5/2014

* cited by examiner

*Primary Examiner* — Charlie Y Peng

(57) ABSTRACT

Disclosed is a nose pad for comfortably supporting eyeglasses in multiple positions. The nose pad comprising a more rigid main portion, and a highly flexible and soft back end portion. The main portion connected to an eyeglass frame and positioned for contacting a user's nose upon wearing the eyeglasses in a normal wearing position. The back end portion connected to this main portion and generally positioned on a back edge of this main portion for contacting a user's forehead area upon wearing the eyeglasses in a tilted up position. The main portion, being more rigid, supports the eyeglasses properly on a user's nose. The soft and flexible back end portion provides a comfortable and non-slipping contact with a user's forehead area. The combination of this main portion with the soft back end portion provides a comfortable and non-slipping contact with a user's nose. The nose pad of the present invention is applicable to all types of eyeglasses.

10 Claims, 6 Drawing Sheets

US 9,939,656 B1

NOSE PAD

CROSS-REFERENCE TO RELATED APPLICATIONS

This application claims the benefit of provisional patent application Ser. No. 61/963,323, filed 2013 Dec. 2 by the present inventor.

BACKGROUND OF THE INVENTION

1. Field of the Invention

The present invention relates to a nose pad that can support eyeglasses comfortably in multiple positions.

2. Description of the Related Art

Often times eyeglasses need to be removed from the normal wearing position, especially for short periods of time. Reasons for removal range from needing to look at something for which lens correction is not needed, to having to look through optical equipment, to being in an area of lower lighting. Complete removal of eyeglasses can lead to misplacing them, and wearing eyeglass straps may not always be feasible. Placing the eyeglasses over the top of the head is very common and fashionable, however oil and other deposits from the hair can get on the lens. One of the styles that is developing with the lighter type of sunglasses is to wear them over the frontal head or forehead area. However, heavier or higher quality eyeglasses tend to slide down and will not stay in position. Even with the lighter type of eyeglasses, the back ends of the nose pads tend to stab into or scrape the forehead area, making them uncomfortable to wear in these positions.

Multiple patents exist concentrating on making eyeglasses comfortable while in the normal wearing position. Also, many concentrate on keeping the eyeglasses from slipping and moving out of position while being worn normally. The majority of these patents concentrate on the nose pad portion of the eyeglasses to achieve the above. It is an objective of the present invention to provide a means for comfortably supporting eyeglasses in multiple positions, including the normal wearing position. The need for temporarily removing eyeglasses from the normal wearing position requires the ability to hold eyeglasses in other positions, while at the same time allowing the eyeglasses to fit correctly when returned to the normal wearing position.

SUMMARY OF THE INVENTION

The present invention provides a means for wearing the eyeglasses tilted up over a forehead area, while allowing them to be supported properly over the nose in the normal wearing position. Since the nose pads of the eyeglasses are the portions that extend out the farthest and contact the forehead area upon wearing the eyeglasses in these other positions, then the nose pad portion is the means used for achieving the above.

The present invention comprises a nose pad portion of a pair of eyeglasses composed of a more rigid main portion and a highly flexible back end portion. The back end portion is preferably made of a soft rubber material and contacts a wearer's forehead area upon wearing the eyeglasses tilted up. The soft and flexible rubber provides a comfortable, non-stabbing, and non-scrapping feel at the point of contact with the forehead area, and the friction of the soft and flexible rubber allows the eyeglasses to stay in place in these positions and not to slide down.

Upon wearing the eyeglasses in a normal wearing position, the front surfaces of the main portions contact the sides of a user's nose. The more rigid main portion supports the eyeglasses properly on a user's nose. The front surfaces of the more soft and flexible back end portions give way and do not interfere with the main portion supporting the eyeglasses properly. They do, however, provide a soft rubber edge to the main portion that feels comfortable on the nose and does not allow the eyeglasses to slide down or out of position. The design spreads out the contact force of the nose pad because it insures a more complete surface contact.

The soft rubber back end portion can be attached to the main portion at a point of manufacturing, or the entire pad can be molded as one piece with a more rigid main portion and a more flexible back end portion. Alternatively, the nose pad configuration can be achieved by the consumer, for example, using self-adhesive parts. The nose pad of the present invention is applicable to all types of eyeglass frames.

DETAILED DESCRIPTION

Preferred Embodiments

Figure 1:
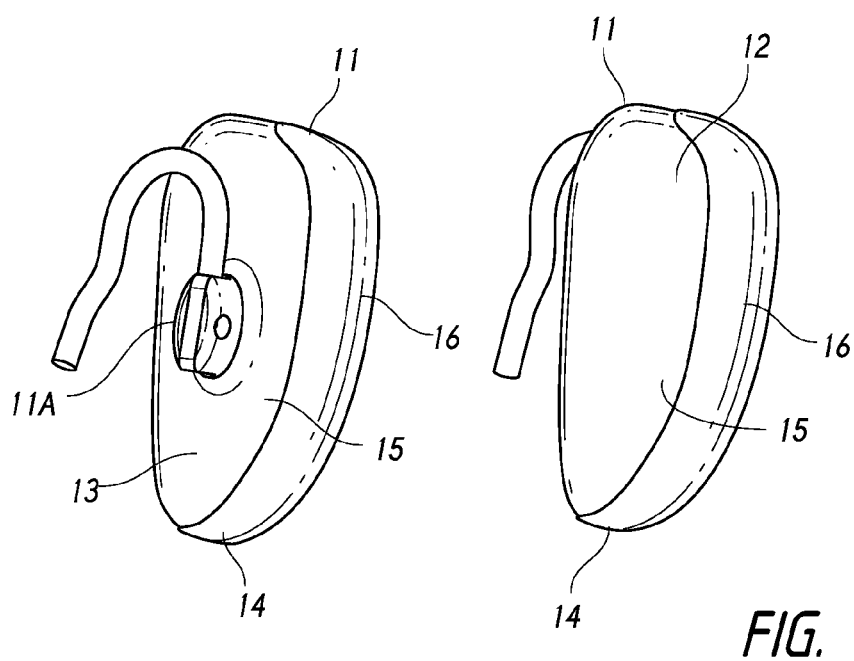
FIG. 1 shows a perspective view of the nose pads of the present invention, in a preferred embodiment.
Figure 1A:
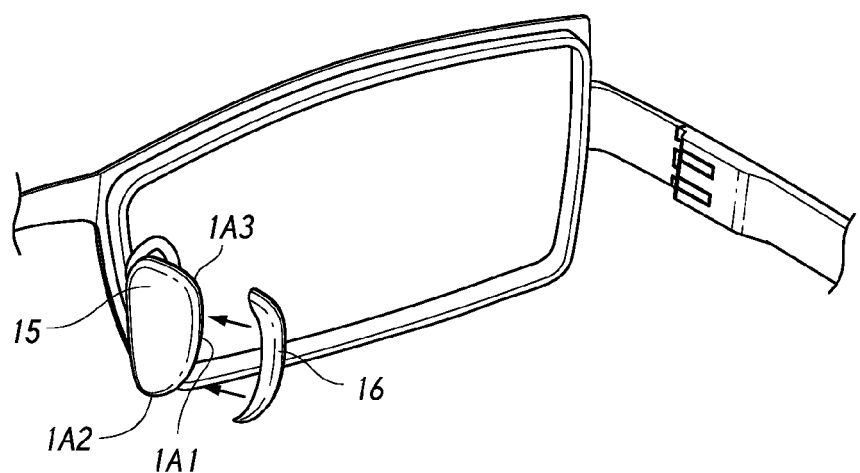
FIGS. 1A and 1AA show details as to how the two portions of the nose pad come together.
Figure 1A:
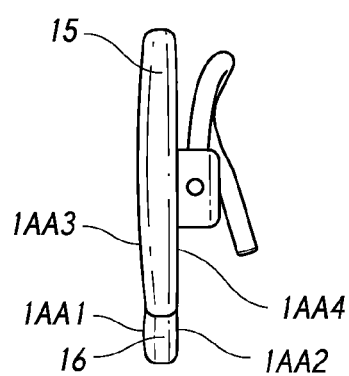

Well know in the art are individual nose pads that connect to an eyeglass frame and support the eyeglasses on a user's nose. These types of nose pads can range from being fully rigid to semi-soft, and can attach to an eyeglass frame via different means. FIG. 1 shows a preferred embodiment of the present invention. It shows individual nose pads similar to the ones described above. It is preferred in this embodiment that the nose pads be D-shaped, as shown in FIG. 1. The nose pads have a pad body 11 and a means for attachment, e.g. a stud and a wire 11A. The nose pad body 11 has a front surface 12, a back surface 13, and peripheral edges 14. The front surface 12 is the part that makes contact with the sides of a user's nose. The pad bodies 11 of the nose pads of the present invention, however, are additionally divided into a main portion 15 and a back end portion 16. The main portion 15 is a more rigid portion and the one that has the means for attachment, and therefore the one that somehow connects, directly or indirectly, to an eyeglass frame. The back end portion 16 is made of a very soft and flexible rubber material and has a very flexible structure. As shown in FIG. 1A, the back end portion 16 is the part of the nose pad that is generally the farthest away from the eyeglass frame upon normal mounting of the nose pad. This back end portion 16 is generally disposed on a back edge 1A1 of the main portion 15. It can cover parts of the bottom edge 1A2 and the top edge 1A3 of the main portion 15. As shown in FIG. 1AA in a top view of the nose pad, the back end front surface 1AA1 and the back end back surface 1AA2 can be considered as extensions of the main portion front surface 1AA3 and the main portion back surface 1AA4, respectively. There is one small exception to this, however. It is preferred that the back end front surface 1AA1 be generally slightly above the main portion front surface 1AA3. This can be achieved by either making the back end portion 16 slightly thicker, or by it being slightly shifted in that direction. The reason for this preference will be explained in the functional description.

Figure 1B:
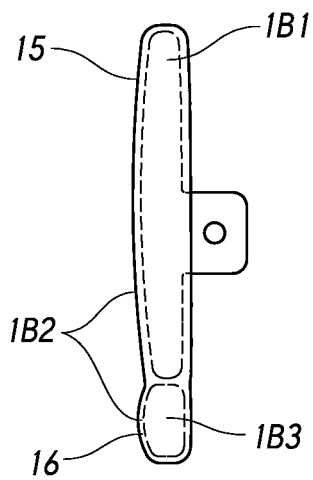
FIGS. 1B and 1C show, in a top view, details of the nose pads that can be made in a one-time molding process.
Figure 1C:
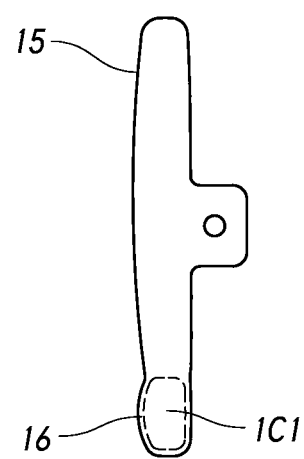

The main portion 15 and the back end portion 16 can be bonded together, or mechanically attached, at a point of manufacturing. The soft rubber material is preferably a soft silicon rubber that is hypo-allergenic and non-irritating on the skin. In this preferred embodiment a very thin and hollow silicon rubber piece is used, such that the back end portion 16 is very soft and flexible. The hollow portion can have holes or openings, as needed, to allow this portion to be very flexible and flatten easily upon contact. As an alternative to bonding or attaching the two portions together, the main portion 15 can consist of a rigid central part 1B1 with a thin soft rubber covering on it, like the silicon rubber described above. This thin soft rubber covering 1B2 can extend beyond the end of the main portion 15 and form the back end portion 16. The back end portion 16 will have a generally hollow center 1B3, instead of the rigid central part of the main portion 15. This is shown in FIG. 1B as a top view of the nose pad. As another option, the main portion 15 can be made entirely of the same soft rubber material, but a piece that is solid all the way through and thereby much more rigid. The back end portion 16 can be, once again, a continuation of this same soft rubber material, but this portion being very thin walled and with a generally hollow center, 1C1. This is shown in FIG. 1C. These two options allow the nose pad to be fabricated in a one-time molding process, making the nose pad easier to manufacture.

Figure 1D:
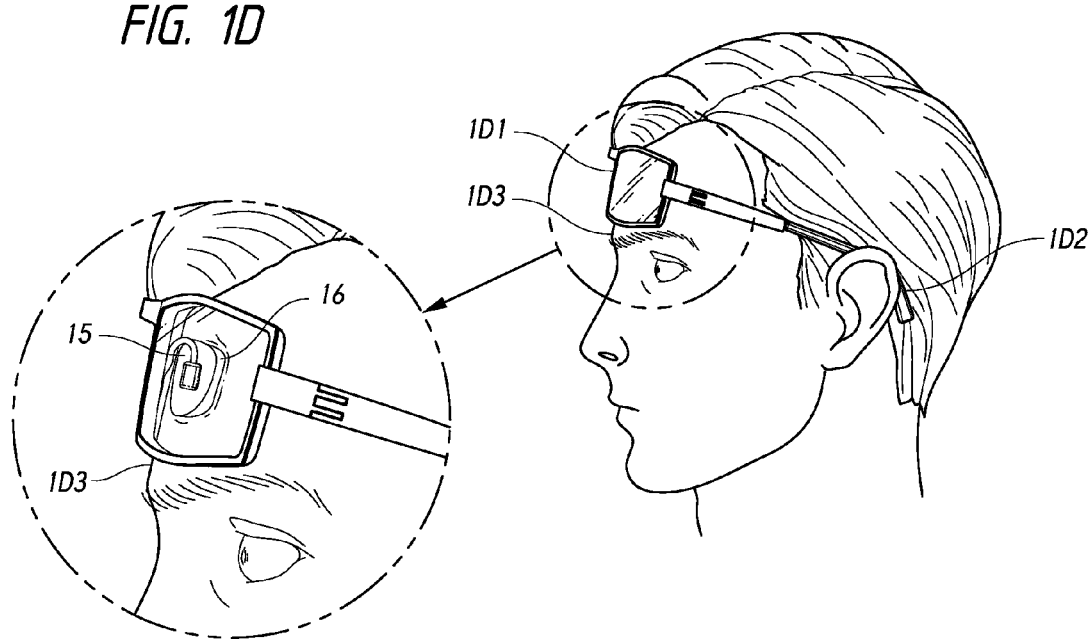
FIGS. 1D, 1E, and 1F illustrate functional aspects of the nose pads of the present invention.

The back end portion 16 of the nose pad will now be described in terms of its function. Advantageous to the design of the present invention is that the eyeglasses can be worn comfortably in a tilted up position. A tilted up position is demonstrated in FIG. 1D. It implies that the frame front 1D1 of the eyeglasses is up higher than the temple ends 1D2 that rest on the ears. In these positions the nose pads of the eyeglasses will be positioned and will contact the skin of the forehead area 1D3. The forehead area 1D3 consists of the part of the head above the eyes and the nose, and includes the frontal portion of the top of the head. The part of the nose pad that will contact the skin of this forehead area 1D3 is the back end portion 16. The very soft and flexible back end portion 16 will not stab into, or scrape the forehead area 1D3 upon contact with it. Instead, it will provide a very comfortable non-slipping contact with the skin that will hold the eyeglasses in these positions.

Figure 1E:
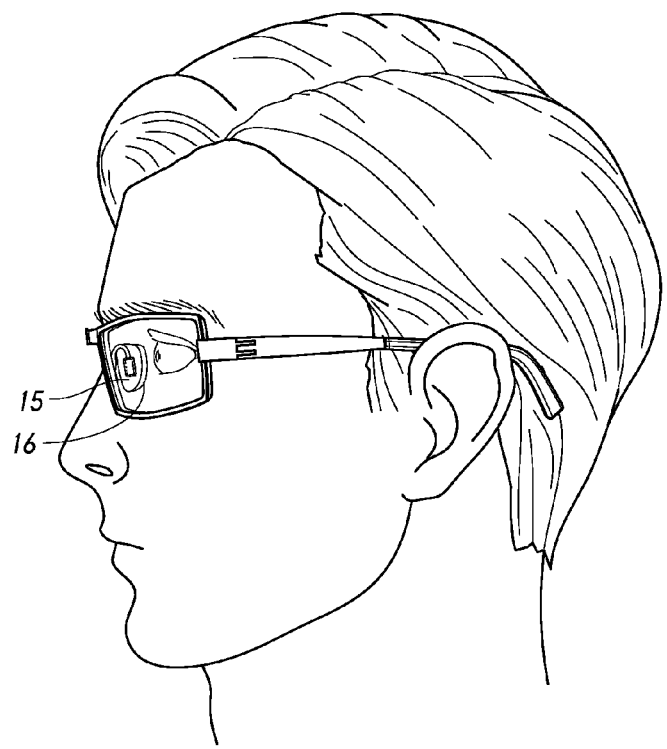
Figure 1F:
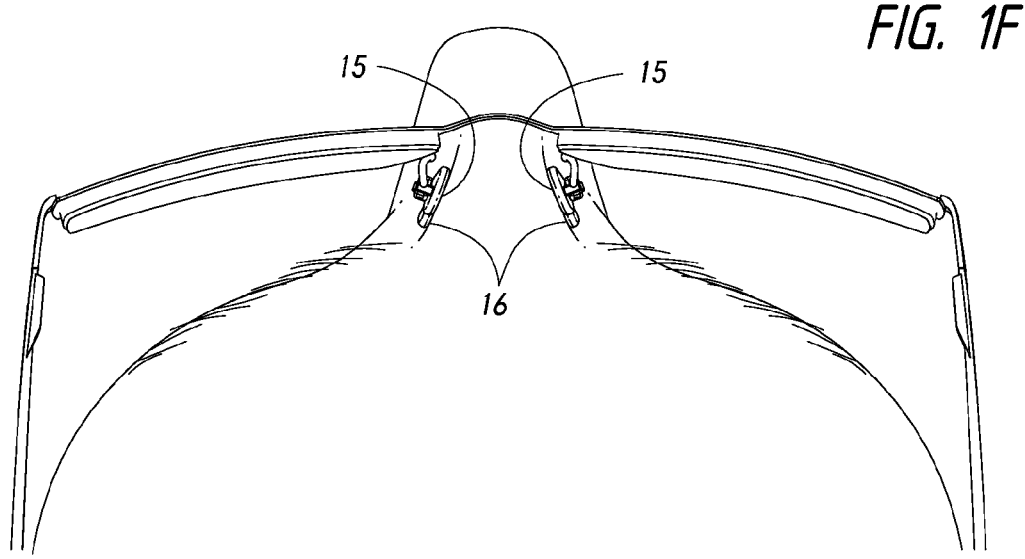

The main portion 15 of the nose pad will now be described in terms of its function. The main portion 15 encompasses the more rigid portion that attaches to the eyeglass frame and that has the more flexible back end portion 16 somehow attached or connected to it. Advantageous to the design is that the eyeglasses can be worn stably and comfortably, in a normal wearing position. The normal wearing position implying that the frame is resting on a wearer's nose, via the nose pads. This is shown in FIG. 1E. Upon wearing the eyeglasses in this position, generally the front surface of the nose pad contacts the side of the nose. As described in FIG. 1AA, with the front surface of the back end portion 16 being slightly above the front surface of the main portion 15, the back end portion 16 contacts the nose slightly ahead of the main portion 15. Since the back end portion 16 is very flexible, it gives way so that the main portion 15 contacts the nose as well. This is shown in FIG. 1F in a top view of the nose region. Since the main portion 15 is more rigid and does not give way, it determines the position of the eyeglasses on a user's nose. The very flexible back end portion 16 does not affect the position of the eyeglasses, but does provide a soft and comfortable feel to the nose pad, and provides a non-slip portion to help hold the eyeglasses from slipping down a user's nose or bouncing up upon quick movements. Since the nose thickness grows towards the back and downward directions, the soft back end portion 16 keeps the back and bottom edges of the main portion 15 from stabbing into the sides of the nose. The design spreads out the contact force of the nose pad because it ensures a more complete surface contact. The back end portions are generally narrow so that they do not obstruct vision and accommodate the fit of the nose pads over the nose when wearing the eyeglasses in the normal wearing position. However upon wearing the eyeglasses tilted up, and upon making contact with the forehead area, the back end portions flatten out to increase the surface area and provide a more comfortable and slip-free contact.

Nose pads that are entirely very soft and flexible will deform and will not comfortably and properly support the eyeglasses on a user's nose in the normal wearing position. In the tilted up position these nose pads will over deform upon contact with a user's forehead area and will not provide the proper support. The nose pad design of the present invention provides proper support as well as comfort.

Alternative Embodiments

Figure 2:
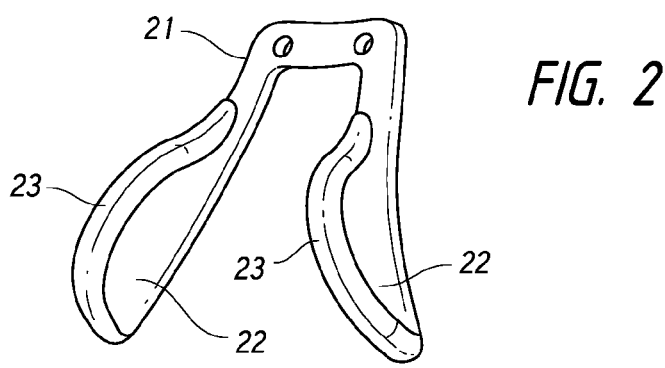
FIG. 2 shows a perspective view of a second embodiment of the present invention.

FIG. 2 shows a second embodiment of the present invention. In this embodiment the nose pad main portions 22 are made as a one-piece nose bridge structure 21 or somehow attach to this nose bridge structure 21, which then attaches to an eyeglass frame. The nose bridge structure 21 can be considered the means for attaching the nose pad main portion 22 to the eyeglass frame. Similar to the preferred embodiment, the nose pad main portions 22 have back end portions 23 that are made of a very soft and flexible rubber material. The main portions 22 and the very soft and flexible back end portions 23 function the same way as in the preferred embodiment.

Figure 3:
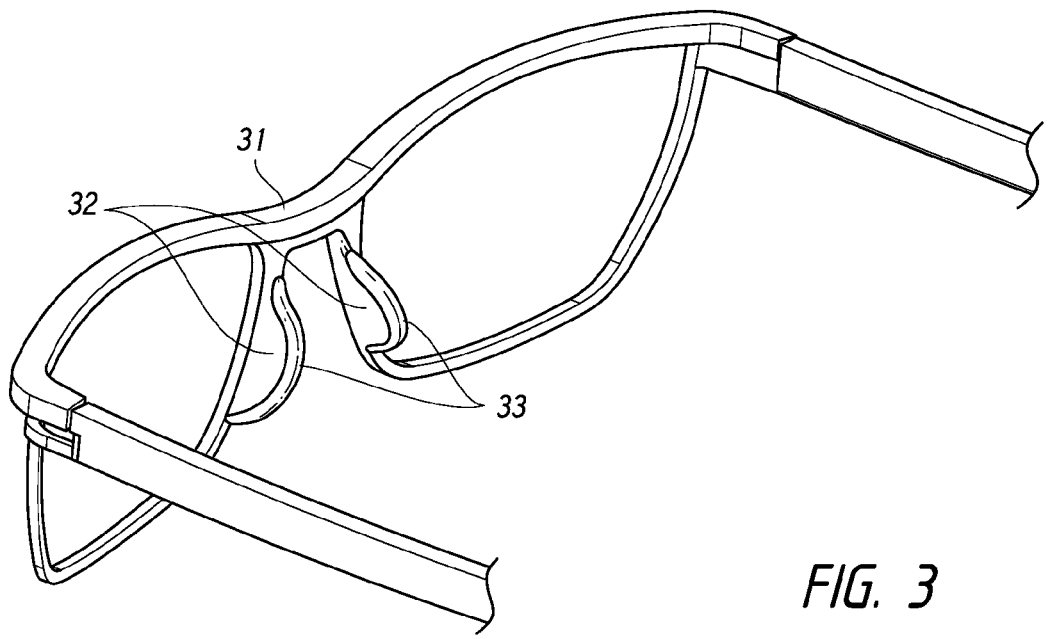
FIG. 3 shows a perspective view of a third embodiment of the present invention.

FIG. 3 shows a third embodiment of the present invention. In this embodiment the nose pad main portions 32 are molded together as one-piece with the eyeglass frame 31. Therefore, the main portions 32 can be considered as part of the eyeglass frame 31. Similarly, the nose pad main portions 32 have back end portions 33 that have a soft and flexible structure.

Figure 4A:
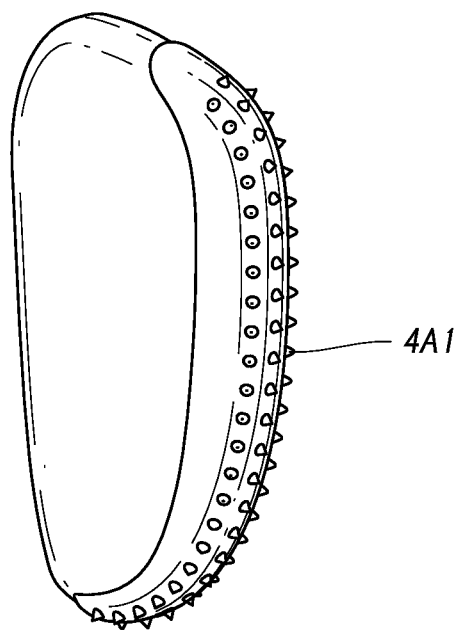
FIGS. 4A and 4B show alternative options for a back end portion of the nose pads.

There are other alternative embodiments in which the soft and flexible rubber materials of the back end portions of the nose pad have different characteristics. FIG. 4A shows the soft rubber back end portion 4A1 with small spikes on it that might be able to penetrate hairy skin better, or more firmly grasp on to wet or oily skin. The spikes, being of the same soft rubber, still feel comfortable on the skin. With these types of shapes, a soft and flexible uniform foam rubber material could be used.

Figure 4B:
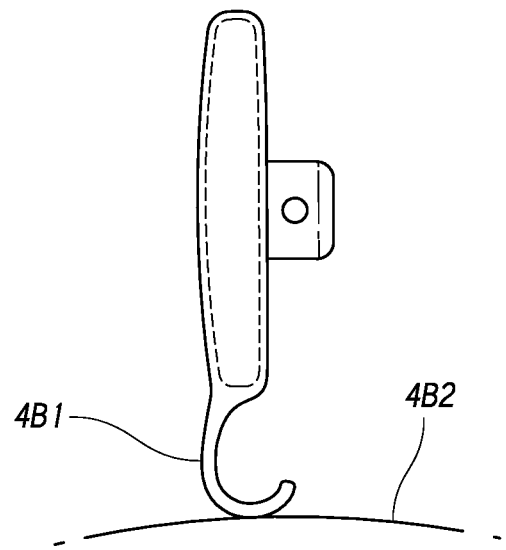

Another option for the back end portion would be to use a thin piece of soft and flexible rubber material. A top view of this is shown in FIG. 4B. The thin piece of material 4B1 instead of just flattening will bend upon making contact with the skin 4B2 to provide a comfortable feel. With the side of the thin piece of material now making contact with the skin, a bigger, more comfortable, non-slip surface now exists.

Figure 5:
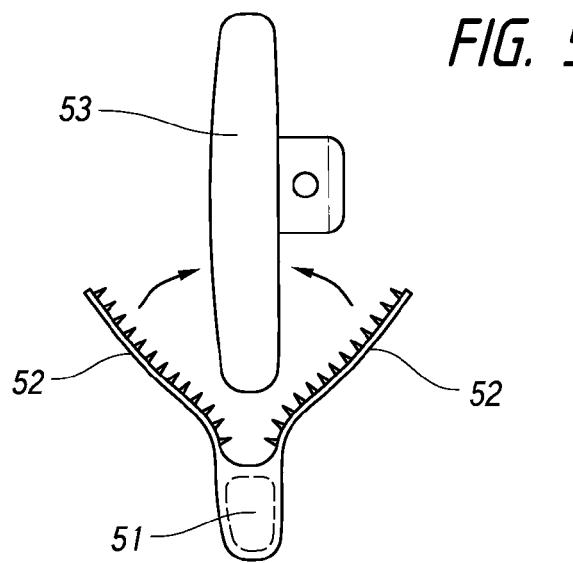
FIGS. 5, 6 AND 7 show alternative options for a consumer applied back end portion of the nose pads.

As an alternative to all of the above embodiments, instead of the soft rubber back end portion being attached at a point of manufacturing, it could be attached by the consumer. The main portion and/or the back end portion could have a means for attaching to each other by the consumer. The back end portion can be of the peel-and-stick type, or it could have a mechanical method of attachment. FIG. 5 shows what the peel-and-stick type would generally look like, in a top view. It could have a soft rubber portion 51 and two thin and flexible flaps 52, preferably made of the same material. The flaps 52 would be the peel-and-stick portions. They would adhere to opposite sides of a typical nose pad 53 such that the soft rubber portion 51 is positioned on the back end of the nose pad 53.

Figure 6:
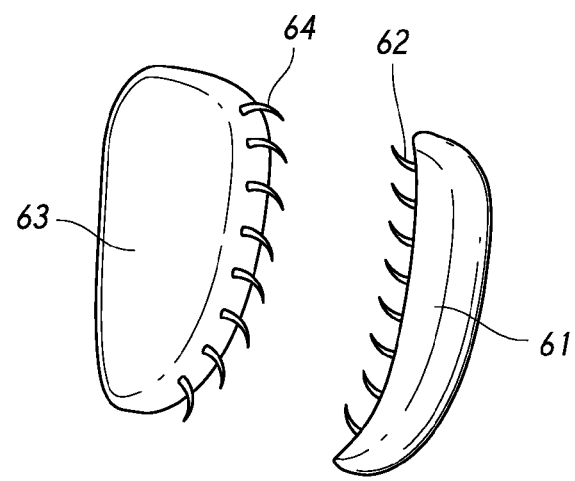
Figure 7:
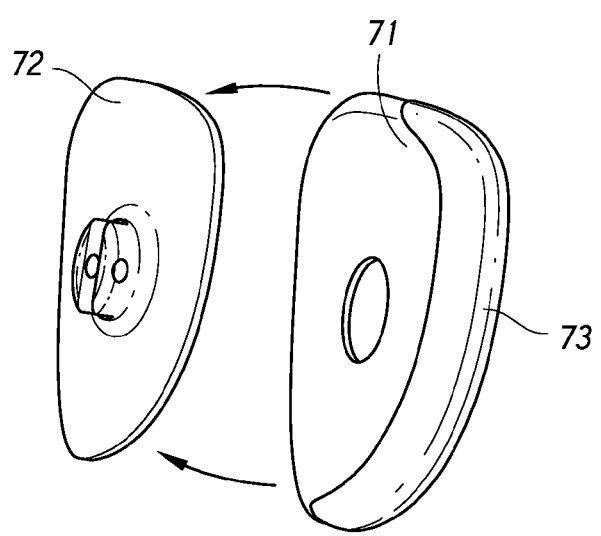

FIG. 6 shows what a mechanically attached soft rubber back end would typically look like. It would have a soft rubber portion 61 with a mechanically engageable part 62. The typical nose pad 63 would then require an opposite mechanically engageable part 64 on its back end for the two pieces to attach together. FIG. 7 shows another alternative to a consumer mechanically applied part. The applied part could be of the slip-on type and could have a thin walled cover 71 that stretches and wraps around a regular nose pad body 72. This cover could have a soft and flexible back end portion 73. The cover is held in place by wrapping tightly around a rigid nose pad body, and thus the main nose pad body portion will be more rigid as compared to the soft and flexible back end portion.

Conclusion, Ramifications, and Scope

Accordingly, it can be seen that the nose pad configuration of the present invention has advantages over all other eyeglass nose pads available in the industry today. It allows for the eyeglasses to be held comfortably in other positions, while at the same time providing proper positioning, comfort, and non-slipping in the normal wearing position. Although the descriptions above contain many specificities, these should not be construed as limiting the scope of the embodiments, but as merely providing illustrations of some of several embodiments. For example, the shape of the soft rubber back end portions can vary. The thickness of the material of the soft rubber back end portions can vary, as well as the structure or configuration. The type or types of material used can vary. Also, the method of attachment of this soft rubber end portion can vary. There can be variations as to how the whole combination of the main portions and soft rubber end portions are built, such that the two portions are formed together. Therefore, the scope of the embodiments should be determined by the appended claims and their legal equivalents, rather than by the examples given.

I claim:

1. A nose pad for eyeglasses comprising, a nose pad body, and a means for attachment to an eyeglass frame, the nose pad body having a main portion and a back end portion, the main portion having a relatively rigid structure and connected to the means for attachment to an eyeglass frame, the back end portion having a structure generally characterized by a thin flexible wall with a hollow center, making it substantially more flexible than said main portion, this back end portion generally disposed on a back edge of said main portion, whereby said back end portion comfortably engages a user's forehead area upon wearing the eyeglasses in a tilted up position, and said main portion properly supports the eyeglasses on a user's nose upon wearing the eyeglasses in a normal wearing position.

2. The nose pad of claim 1, wherein the main portion and the back end portion of the nose pad body are fabricated together in a one-time molding process.

3. The nose pad of claim 1, wherein the back end portion of the nose pad body is made of a silicone rubber material.

4. The nose pad of claim 1, wherein the means for attachment to an eyeglass frame includes a stud and a wire.

5. The nose pad of claim 1, wherein the means for attachment to an eyeglass frame includes a nose bridge structure.

6. A nose pad for eyeglasses comprising, a nose pad body, and a means for attachment to an eyeglass frame, the nose pad body having a relatively rigid main portion for contacting a user's nose upon wearing the eyeglasses in a normal wearing position, and a relatively flexible back end portion generally characterized by a thin flexible wall with a hollow center, said back end portion generally disposed on a back edge of said main portion for contacting a user's forehead area upon wearing the eyeglasses in a tilted up position, whereby the eyeglasses can be properly supported in a normal wearing position and comfortably supported in a tilted up position.

7. The nose pad of claim 6, wherein the main portion and the back end portion of the nose pad body are connected together at a point of manufacturing.

8. The nose pad of claim 6, wherein the main portion or the back end portion of the nose pad body has a means for attaching to each other by the consumer.

9. The nose pad of claim 6, wherein the back end portion of the nose pad body is made of a foam rubber material.

10. The nose pad of claim 6, wherein the eyeglass frame and the main portion of the nose pad body are fabricated together in a one-time molding process.

* * * * *